Figure 4:
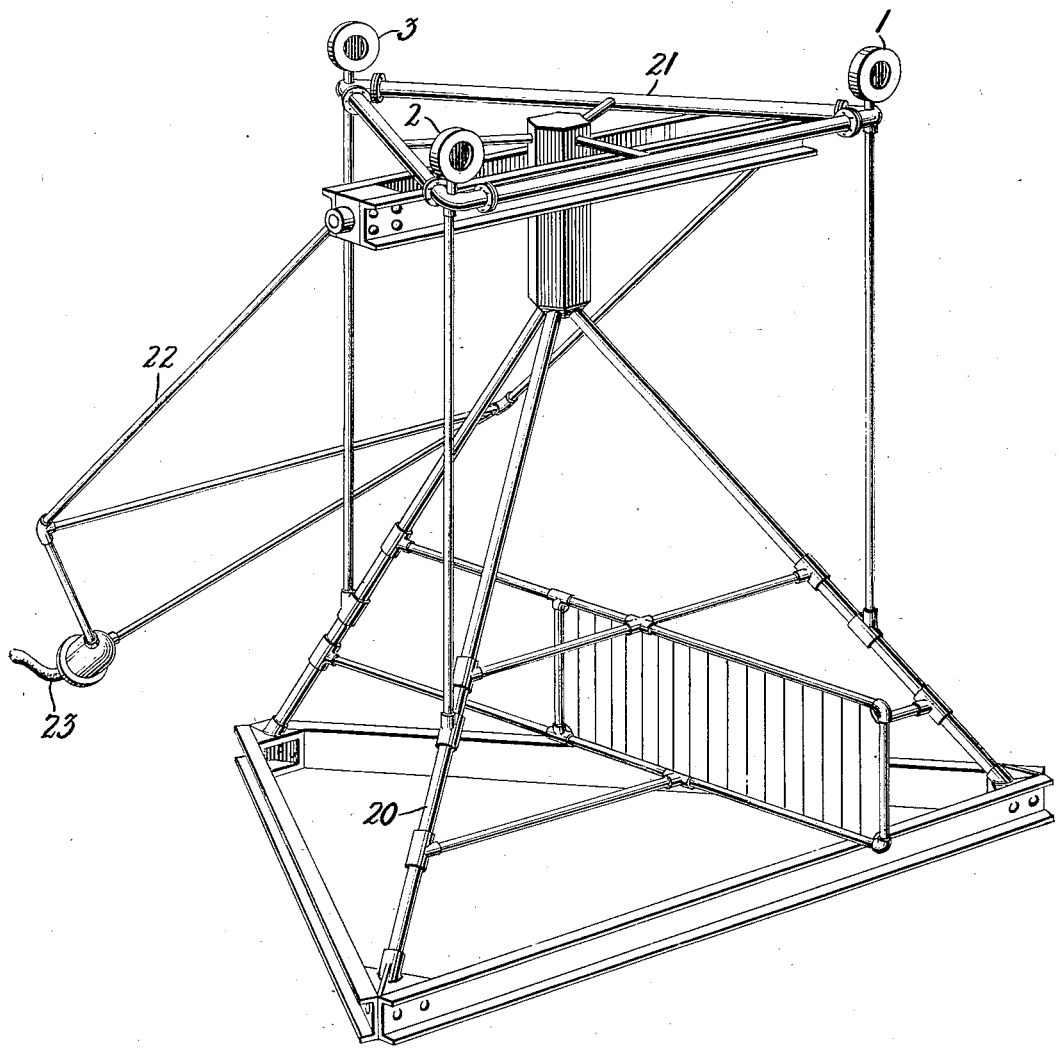

July 22, 1924.
T. C. FRY
1,502,243
SYSTEM FOR DETERMINING THE DIRECTION OF PROPAGATION OF WAVE ENERGY
Filed Nov. 13, 1920      2 Sheets-Sheet 1
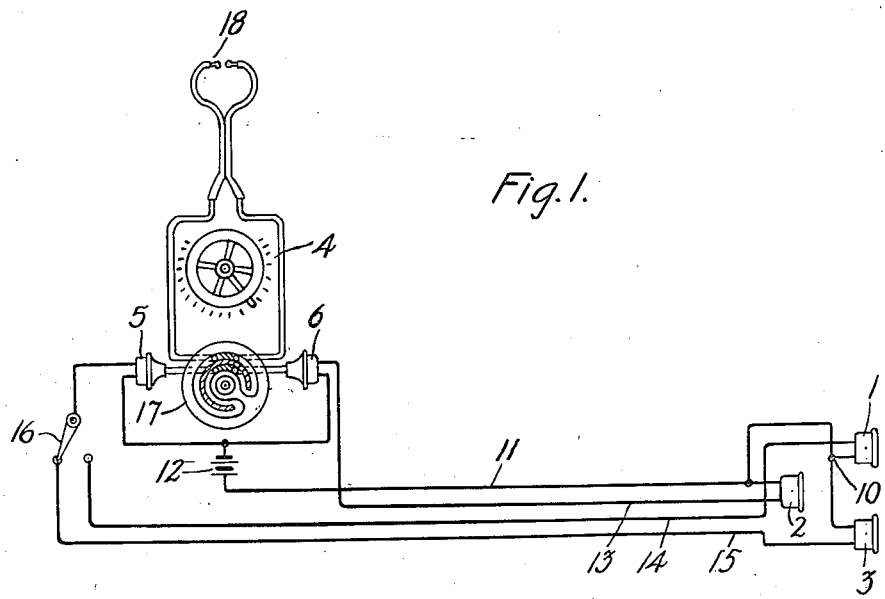
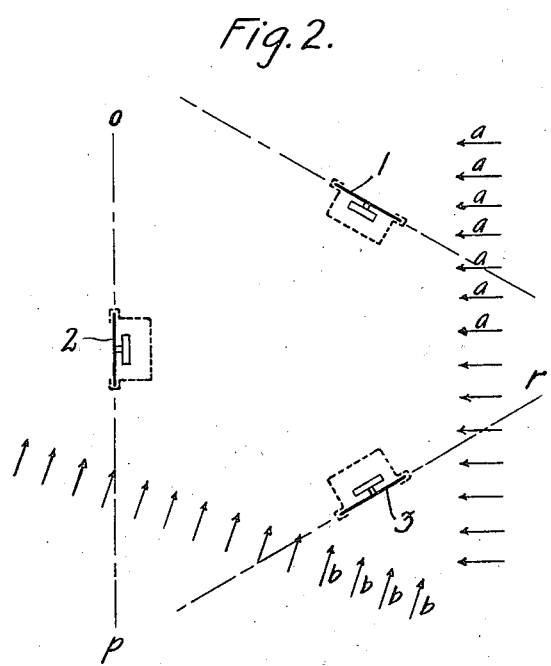
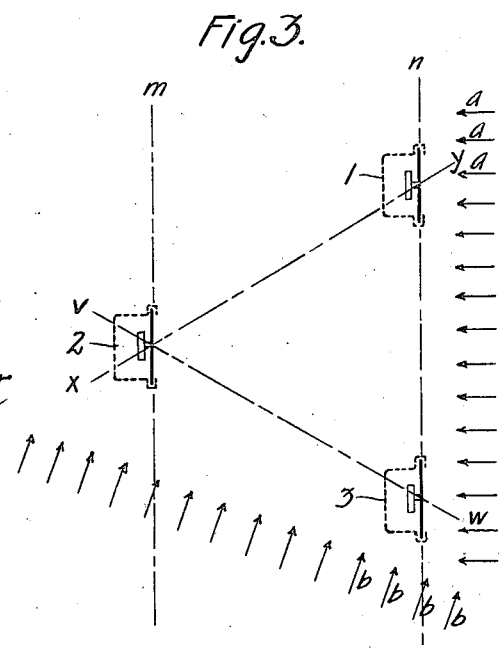
Inventor:
Thornton C. Fry.
by Joel C. R. Palmer
Atty.

July 22, 1924.

T. C. FRY 1,502,243

SYSTEM FOR DETERMINING THE DIRECTION OF PROPAGATION OF WAVE ENERGY

Filed Nov. 13, 1920   2 Sheets-Sheet 2

Inventor:
Thornton C. Fry.
By Joel R. Palmer
Atty.

Patented July 22, 1924.

1,502,243

UNITED STATES PATENT OFFICE.

THORNTON C. FRY, OF WYOMING, NEW JERSEY, ASSIGNOR TO WESTERN ELECTRIC COMPANY, INCORPORATED, OF NEW YORK, N. Y., A CORPORATION OF NEW YORK.

SYSTEM FOR DETERMINING THE DIRECTION OF PROPAGATION OF WAVE ENERGY.

Application filed November 13, 1920. Serial No. 423,922.

*To all whom it may concern:*

Be it known that I, THORNTON C. FRY, a citizen of the United States, residing at Wyoming, in the county of Essex, State of New Jersey, have invented certain new and useful Improvements in Systems for Determining the Direction of Propagation of Wave Energy, of which the following is a full, clear, concise, and exact description.

The invention relates to a system for determining the direction of propagation of wave energy.

In determining the bearing of a source of wave energy, such as a sound source, from a distant point or base line, the so-called binaural method of comparing the response of a pair of detectors has been successfully used. This method consists essentially in comparing the response of a pair of detectors by conducting such response to the opposite ears of the observer through adjustable paths which may be either acoustic or electrical. By relatively varying the paths between the responsive devices an effect may be received similar to that of a sound directly in front of the observer. It has been shown that the relative lengths of the two paths between the responsive devices and the observer's ears when such effect is obtained is a measure of the time interval elapsing between the arrival of a given wave front at the two responsive devices or detectors. If only two detectors are thus compared, however, for any given adjustment to obtain a balance, either of two bearings are indicated, one being the bearing of the sound source and the other of its image. In order to eliminate this ambiguity it is common to make another binaural comparison using another pair of detectors, located on a base line that intersects that of the previous pair. By means of the two balances the direction of the sound source can readily be ascertained since the direction indicated for the source itself will check in the two observations, while the direction of the image so indicated will not check.

Various arrangements and combinations of detectors have been proposed, such as at the apices of a triangle, a square or other polygon or on the circumference of a circle. The binaural method, however, depends for its success upon the same conditions affecting the energy in its travel over the paths from the source to the ears of the observer. For this reason the detecting devices, the response of which is to be compared, are very carefully matched both as to electrical and mechanical characteristics, it having been recognized that any variation in this respect would render the determination more or less inaccurate.

In practice the detectors generally take the form of a microphone or a stethoscopic device, both of which involve supporting mechanically some sort of a diaphragm or sound responsive device. The support of such device involves a certain amount of mechanical structure which takes the form of a casing, commonly of substantial dimensions, particularly when used under water since, in addition to serving as a mounting for the sound responsive device, it also encloses and protects the device from mechanical injury.

In binaural systems heretofore used the detectors have been oriented in various directions, usually facing outwardly from the center of the group. This arrangement has doubtless been used in view of still earlier systems, which depend upon a comparison of the intensity of the sound waves received to determine direction, wherein the detectors were so oriented as to have at least one detector facing in the general direction of propagation of the wave regardless of the position of the source. When the binaural method came into use the orientation of the detectors was not considered material because of the often stated principle of acoustics that an obstacle small compared with the wave length of sound casts no appreciable sound shadow which has been used as the basis for assertions that the geometrical configuration of the supports of detectors or the detector casings such as are commonly used could have no appreciable effect upon the intensity of the sound detected nor upon the directional properties of the system. It can however be demonstrated both experimentally and mathematically that the latter part of this statement is in error.

In the usual type of detector the sound responsive body is a diaphragm which is principally affected by variation in pressure due to a travelling wave front in the medium in which the detector is immersed. Since any diaphragm or other similar sound responsive body has appreciable dimensions, no matter how small or what configuration is chosen for the detector mounting, the pressure field due to the sound wave will be as a matter of fact affected by the detector mounting.

To demonstrate this experimentally, it is only necessary to associate the usual compensator arrangement of a binaural system with a pair of detectors and arrange one of the detectors so that it may be rotated through say 180 degrees about an axis in the plane of the diaphragm. If the response of these two detectors is compared with respect to a fixed sound source, and by manipulation of the compensator a balance is obtained, this balance will be disturbed by merely rotating one of the detectors through any convenient angle, say 180 degrees. If the detector casing or mounting had no effect upon the phase of the pressure wave acting upon the diaphragm, obviously merely reversing one detector 180 degrees would have no effect upon the balance.

The effect of an object on the pressure field of a sound wave has been investigated mathematically by Raylaigh, who has derived equations for the potential of the plain sound wave with and without a spherical object interposed in the field of the wave. These equations are given in sections 245 and 334 of Volume II of Raylaigh's "Theory of Sound." The equations representing the two conditions are substantially different and form a basis from which equations may be derived for the pressure phase at any point on the sphere from which equations the differences in phase at various points on the sphere may be calculated. Calculations have been made on this basis for various sizes of spheres and curves plotted, which show that there is a material difference in phase at various points around the sphere, even though the sphere may be small in comparison with the wave length of the sound under investigation. It is immaterial whether the sphere or other obstacle causes an effect which may be identified as a sound shadow, since, regardless of the term used to designate the effect produced on the field by the interposition of an obstacle therein, the obstacle does have a material effect upon the phase of the pressure wave in the field in which it is immersed. While this phase-shifting effect is dependent upon the dimensions and configuration of the obstacle, the binaural method involves a relative measurement of phase difference and not an absolute measurement so that by using detectors of the same configuration and dimensions, the phase-shift introduced by the detectors and their mountings will be the same provided the sound-responsive elements of detectors are located at the same points on the detector structure, and the two detector structures are so related that the angular position of the sound responsive elements, relative to the wave front are the same. Under these conditions the distortion of the sound field in the vicinity of a sound responsive element or diaphragm will be substantially the same for all such sound responsive elements, and the phase-shift attributable to such distortion will be the same in each case. The invention therefore aims to avoid irregularities and inaccuracies introduced in a binaural system due to the phase-shifting effects of the detectors and their supports by utilizing detectors of identical construction, configuration and dimensions, and orienting all of the detectors so that the sound responsive elements thereof face the same direction.

In the accompanying drawings, which disclose an embodiment of the invention, Fig. 1 is a diagrammatic representation of the apparatus and circuits of a binaural system with the detectors arranged in accordance with the invention; Fig. 2 is a diagram showing a common arrangement of detectors; Fig. 3 is a similar diagram showing an arrangement in accordance with the invention; and Fig. 4 is a perspective view of a tripod for under-water use having detectors arranged in accordance with the present invention. The detectors 1, 2 and 3, as shown diagrammatically in Figs. 2 and 3, are of the microphone type well known in the art and involve a casing in the form of a cup or a drum, a diaphragm over the open end of the casing, and a microphone button supported on the diaphragm. Although only three detectors are shown, it will be understood that any number greater than three may be used. It is essential to eliminate ambiguity when determining direction by the binaural method, that at least three detectors be used on intersecting base lines.

With the three detector arrangement the detectors are ordinarily arranged at the apices of an equilateral triangle, and as shown in Fig. 2, which shows the arrangement in common use, the diaphragms of the detectors facing outwardly from a common center. If a wave-front, such as represented by the arrows $a$ in Fig. 2 encounters the detector arrangement shown in Fig. 2, the detectors 1 and 3 will be equally affected as to intensity and as to time of arrival of a wave front at the diaphragms. Comparing however detectors 1 and 2, this condition does not exist and the wave front $a$ will arrive at detector 2 at an interval later than its arrival at detector 1, not merely equal to the difference in time for the wave to travel from the detector 1 to detector 2, but to this difference increased by an additional amount due to the fact that the distortion of the sound field is not the same in the vicinity of the two detectors. In other words, since, with respect to the wave-front $a$, the detectors 1 and 2 are orientated in different directions, the effect of the casing of the two detectors will be different. The same condition obtains with respect to the detectors 2 and 3 when compared with respect to the wave-front $a$. If we take some other wave-front, such as indicated by the arrows $b$, it will be seen that the phase-shifting effects of the casings of all three detectors 1, 2 and 3 will be different. In any arrangement of detectors, where the diaphragms are orientated in different directions, the binaural balances obtained will be inaccurate as a measure of the bearing of the sound source with the exception of one particular bearing for each pair. In other words, with the drum type of detector, if the planes of the diaphragms of two detectors intersect, there will only be one condition where a binaural comparison of the response of the two diaphragms will be accurate, and that will be in the case where the direction of propagation of the sound wave makes the same angle with the two planes.

In the detector arrangement shown in Fig. 3, which is the arrangement of the invention, the detectors 1, 2 and 3 are orientated in the same direction and the planes of the diaphragms represented by the lines M and N are parallel. In an arrangement of this sort with respect to either the waves indicated by the arrows $a$ or the arrows $b$, the phase-shifting effect of the detector casings is identical. Regardless of the direction of propagation of any particular sound wave under investigation, a similar orientation of detector support will be encountered by the sound wave in reaching the sound-responsive element of any detector. It is obvious that this condition will obtain regardless of the number of detectors used or compared.

In actual practice the detectors are supported as shown in Fig. 4. In this figure a structural steel tripod, indicated as a whole by the reference character 20 supports at its upper end a triangle 21, at the apices of of which are mounted detectors 1, 2 and 3. These detectors are of the drum type and as shown are all orientated in the same direction with the diaphragms located in parallel-vertical planes. The tripod is lowered to the sea bottom by means of a cable attached to the bail 22 and the electrical conductors leading to the detectors are carried to the observing point by means of the cable 23. The circuit arrangement is shown in in Fig. 1, wherein one side of each detector 1, 2 and 3 is connected to a source of potential 12 by common conductor 11. The other side of the detector 2 is connected to a telephone receiver 6 through a conductor 13, and the receiver 6 is connected to the other side of a source of potential 12. The detectors 1 and 3 are alternately connected through the conductors 14 and 15 and the switch 16 with the receiver 5 on the other side of the battery. The receivers 5 and 6 when operated in response to the operation of the detectors, set up vibrations in which currents are passed through the compensator discs 17 to the ear pieces 18, as is usual in a so-called acoustic compensator. The balance is obtained by adjusting the plate 17 by the hand wheel 4. The compensator may be calibrated so that for any given position of balance the direction of the sound source will be indicated, and with the detectors located as described in accordance with the invention, this calibration will be accurate regardless of the direction from which the particular sound wave is propagated. Unless the detectors are located in accordance with the invention, this calibration cannot be made accurate, except for a very limited range of bearings.

Although the invention has been described in connection with the drum type of detectors, it is obvious that the particular configuration or the dimensions of the detectors and detector supports are immaterial as long as the configuration and dimensions are the same, and the detectors are supported, with the sound-responsive elements thereof, orientated in the same direction.

What is claimed is:

1. In a system for determining the direction of propagation of wave energy, the combination of a plurality of detectors including sound-responsive elements and casings for said elements of identical dimensions and configuration, means for supporting said detectors in position on intersecting base lines with the sound-responsive elements similarly orientated, so that the diaphragms of said sound responsive elements lie in parallel vertical planes and means for binaurally comparing the response of said detectors.

2. In a system for determining the direction of propagation of wave energy, the combination of a plurality of detectors including diaphragms and supports for the same of identical dimensions and configuration, means for supporting the detectors with the diaphragms facing the same direction and lying in parallel vertical planes, and means for binaurally comparing the response of said detectors.

3. In a system for determining the direction of propagation of wave energy, the combination of a plurality of detectors including diaphragms and supports therefor of identical configuration and dimensions, means for supporting said detectors with the diaphragms in parallel vertical planes and facing the same direction, and means for binaurally comparing the response of the detectors.

4. In a system for determining the direction of propagation of wave energy, the combination of a plurality of detectors including diaphragms and supports therefor of identical configuration and dimensions, means for supporting said detectors with the diaphragms in vertical planes and facing the same direction, and means for binaurally comparing the response of the detectors.

5. In a method of locating a source of subaqueous vibrations the combination of a tripod supporting a plane table carrying three vibration responsive devices on intersecting base lines in the form of a equi-lateral triangle, said vibration responsive devices having casings and diaphragms and having their diaphragms lying in parallel planes facing one direction, means to translate the response of said vibration responsive devices into observable effects, and means for observing those effects.

In witness whereof, I hereunto subscribe my name this 9th day of November, A. D. 1920.

THORNTON C. FRY.